(12) United States Patent
Camenisch et al.

(10) Patent No.: US 10,171,249 B2
(45) Date of Patent: Jan. 1, 2019

(54) PRIVACY FRIENDLY LOCATION BASED SERVICES

(71) Applicant: International Business Machines Corporation, Armonk, NY (US)

(72) Inventors: Jan L. Camenisch, Zurich (CH); Diego A. Ortiz-Yepes, Zurich (CH); Franz-Stefan Preiss, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 217 days.

(21) Appl. No.: 14/943,144

(22) Filed: Nov. 17, 2015

(65) Prior Publication Data
US 2017/0141925 A1 May 18, 2017

(51) Int. Cl.
| | |
|---|---|
| *H04L 29/06* | (2006.01) |
| *H04L 9/32* | (2006.01) |
| *H04L 9/30* | (2006.01) |
| *G06F 21/33* | (2013.01) |
| *H04W 12/02* | (2009.01) |
| *H04W 12/10* | (2009.01) |

(52) U.S. Cl.
CPC .......... *H04L 9/3249* (2013.01); *G06F 21/335* (2013.01); *H04L 9/302* (2013.01); *H04L 9/3263* (2013.01); *H04L 63/0823* (2013.01); *H04L 63/107* (2013.01); *H04W 12/02* (2013.01); *H04W 12/10* (2013.01); *G06F 2221/2111* (2013.01); *H04L 63/0421* (2013.01); *H04L 63/123* (2013.01)

(58) Field of Classification Search
CPC ....... H04W 48/00–48/10; H04W 4/02; H04W 4/021; H04L 63/10; H04L 63/107; H04L 63/108
See application file for complete search history.

(56) References Cited

U.S. PATENT DOCUMENTS

| | | | |
|---|---|---|---|
| 7,561,888 B2 | 7/2009 | Jennings | |
| 8,972,605 B2 | 3/2015 | Fletcher et al. | |
| 9,038,158 B1* | 5/2015 | MacKay | H04L 9/0872 709/225 |
| 9,178,877 B1* | 11/2015 | Koneru | H04L 63/0853 |
| 2002/0028671 A1* | 3/2002 | I'Anson | H04W 4/02 455/414.1 |
| 2012/0005098 A1* | 1/2012 | Gross | G06F 21/31 705/50 |

(Continued)

*Primary Examiner* — Khang Do
(74) *Attorney, Agent, or Firm* — Cantor Colburn LLP; Daniel Morris (57) ABSTRACT

The present disclosure relates to a cryptographic method for enabling access by a user device to services provided by a server in a set of reference areas. The method comprises at the user device: obtaining a set of reference credentials of the server certifying data indicating the reference areas; obtaining a location credential certifying location data indicating the current location of the user device; generating an authentication token comprising a cryptographic proof for proving that the current location of the user device certified by the location credential matches at least one reference area certified by the set of reference credentials; sending the authentication token to the server for accessing the services by the user device in the at least one reference area.

14 Claims, 2 Drawing Sheets

(56) References Cited

U.S. PATENT DOCUMENTS

| | | |
|---|---|---|
| 2012/0203663 A1 | 8/2012 | Sinclair et al. |
| 2013/0226800 A1 | 8/2013 | Patel et al. |
| 2014/0188617 A1* | 7/2014 | Raman ............... G06Q 30/0261 |
| | | 705/14.58 |
| 2015/0141038 A1* | 5/2015 | Meredith .............. H04W 4/021 |
| | | 455/456.1 |
| 2016/0063471 A1* | 3/2016 | Kobres ................ G06F 21/316 |
| | | 705/18 |
| 2016/0116274 A1* | 4/2016 | Meredith .............. H04W 4/029 |
| | | 702/150 |

* cited by examiner

Fig. 4 ant patent US 10,171,249 B2

PRIVACY FRIENDLY LOCATION BASED SERVICES

BACKGROUND

The present invention relates to the field of digital computer systems, and more specifically, to a cryptographic method for enabling access to services provided by a server provider.

Mobile devices are increasingly used to authenticate towards service providers, getting physical access as well as to authorize transactions such as payments of good or tickets. Often, the token used in this process are software tokens and thus require additional protection

SUMMARY

Various embodiments provide methods for enabling access to services provided by a server in a set of reference areas and a computer program product as described by the subject matter of the independent claims. Advantageous embodiments are described in the dependent claims. Embodiments of the present invention can be freely combined with each other if they are not mutually exclusive.

According to an embodiment of the present invention there is provided a cryptographic method for enabling access by a user device and/or a user of the user device to services provided by a server in a set of reference areas (also referred to as the reference areas). The method comprises at the user device: obtaining a set of reference credentials (also referred to as reference credentials) of the server certifying data indicating the reference areas; obtaining a location credential certifying location data indicating the current location of the user device; generating an authentication token comprising a cryptographic proof for proving that the current location of the user device certified by the location credential matches at least one reference area certified by the set of reference credentials; sending the authentication token to the server for accessing the services by the user device and/or a user of the user device in the at least one reference area.

According to an embodiment of the present invention there is provided a cryptographic method for enabling access by a user device and/or a user of the user device to services provided by a server in a set of reference areas. The method comprises at the server: publishing a set of reference credentials certifying data indicating the reference areas; receiving an authentication token from the user device, the authentication token comprising a cryptographic proof for proving that the location of the user device matches at least one of reference area of the set of reference areas; determining from the cryptographic proof that the location of the user device matches at least one area of the set of reference areas; enabling the access to the services by the user device and/or a user of the user device in the at least one area.

According to an embodiment of the present invention there is provided a computer program product comprising a computer-readable storage medium having computer-readable program code embodied therewith, the computer-readable program code configured to implement all of steps of the method according to any of preceding embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

This disclosure puts forth a mechanism to verify whether a token owner's mobile device currently resides within a geographical area (e.g. and at a given time), thus enabling the use of the location as an additional authentication factor. Trustworthiness, privacy, and reliability may thus be enabled.

As used herein, the term "credential" as used herein may consist of public/private key pairs, symmetric keys, X.509 public key certificates, attribute certificates, and/or application data. The credential may be represented using a predefined format. As used herein, the term "token" may refer to any data possessed by a device and/or derived from data possessed by the device. For example, the token may include and/or be derived from data provisioned to the device by another device. In some examples, the token may be unique to the device.

The present method may have the advantage of enabling a controlled and secure access to the services provided or controlled by the server, while preserving privacy of the information related to the user device such as its position. This may prevent for example the revealing or publication of the position of the user device by the server.

Using for example a grid-based representation (e.g. Military Grid Reference System) for representing or defining the reference areas and the location of the user device may allow to efficiently prove the position matching or position coincidence. This is because no range proofs need to be done. Instead, the server publishes signatures on the valid grid areas (i.e. the reference areas) and then the user device may prove that the reported coordinate match one of the valid grid areas by proving that they are equal to the ones signed by the server.

According to one embodiment, the cryptographic proof is generated without revealing the current location of the user device to the server. For example, the current location of the user device may be hidden. This may increase the privacy protection for users of the user device. According to one embodiment, the location credential being obtained by: communicating with a mobile network controller of a network to which the user device is connected to obtain the location credential, the current location being determined by the mobile network controller.

The mobile network controller may comprise a mobile network operator server. This embodiment may have the advantage of increasing the secure aspect of the present method in that the location credential is delivered by a third party. This is in contrast to the case where the location credential is issued by the user device itself, which may be misused by untrusted users. This may particularly advantageous in case of multiple user devices where a centralized issuer may be used to ensure that the location credentials are uniformly generated.

According to one embodiment, the set of reference areas being describable using a first set of different precision levels, the first set of precision levels being indicated by respective first attributes in the reference credentials, the current location being describable using a second set of different precision levels, the second set of precision levels being indicated by respective second attributes in the location credential, the cryptographic proof proving that the second set of attributes of the at least one reference area is matching at least part of the first set of attributes. For example, if the first set of precision levels comprises {country, region, city, street} a given reference area may be defined as street 1, city 2, region 4, country 7. The second set of precision levels may be as precise as or more or less precise than as the first set of precision levels e.g. {country, region, city} and the location of the user device may match in this case the given reference area if it is located at city 2, region 4, country 7. In another example, the second set of precision levels may be {country, region, city, street} and the location of the user device may match the given reference area if it is located at street 1, city 2, region 4, country 7. For example, each reference area of the set of reference areas may be describable using a respective first set of different precision levels, the first set of precision levels being indicated by respective first attributes in the reference credential of the each reference area. In another example, the set of reference areas may be describable using a common first set of different precision levels, the first set of precision levels being indicated by respective first attributes in the reference credential of each of the reference areas.

For example, the first set of precise levels may comprise {10 km, 1 km, 1 m, 1 cm, 1 mm}, and the second set of precision levels may comprise {10 km, 1 km, 1 m, 1 cm} or vice versa. In one example, the reference areas may be determined using a Military grid reference system (MGRS). For example, a reference area may be defined as 4QFJ 12345 67890, where:

| | |
|---|---|
| 4Q | GZD (grid zone designator) only, precision level 6° × 8° |
| QFJ | GZD and 100 km Grid Square ID, precision level 100 km |
| 4QFJ 1 6 | precision level 10 km |
| 4QFJ 12 67 | precision level 1 km |
| 4QFJ 123 678 | precision level 100 m |
| 4QFJ 1234 6789 | precision level 10 m |
| 4QFJ 12345 67890 | precision level 1 m |

The location of the user device may be determined using the method used for defining the reference areas.

These embodiments may further enable the control of accesses to the services based on different precision levels of the position. For example, it may be decided that the user device may use services of the server if the user device is not more than 100 m far away from the device that provides the services.

According to one embodiment, the location credential and the set of reference credentials are signed using a predefined signature scheme, the predefined signature scheme comprising a Camenisch-Lysyanskaya signature scheme. According to one embodiment, a reference credential of the reference credentials further certifies a time period for accessing the reference areas, and wherein said authentication token includes a timestamp that matches the time period, the timestamp indicating the time at which the current location is determined.

Adding a time constraint may further enable the control access to the services. In addition to advantages described earlier, use of the timestamp in this embodiment ensures that the authentication token can only be used within a short time following issue of the location credential. This embodiment thus may offer additional security and privacy for the user of the user device.

According to one embodiment, the obtaining of the set of reference credentials comprising: receiving from the server a message comprising the set of reference credentials. This may for example have the advantage of providing non-outdated reference credentials, in contrast to the case where the set of reference credentials are obtained from a storage area.

According to one embodiment, the location credential certifies the location data under a cryptographic key of the mobile network controller. This embodiment may offer additional security and privacy for the user of the user device.

According to one embodiment, the cryptographic proof is condensed into a cryptographic function such as a signature proof of knowledge, SPK, for communication to the server. The SPK is a cryptographic primitive which makes use of a special digital signature on a given message to prove possession of some secret knowledge by the user device (i.e. signer).

According to one embodiment, the authentication token comprises a cryptographic token. According to one embodiment, the authentication token is an anonymous token. These embodiments may offer additional security and privacy for the user of the user device.

Figure 1:
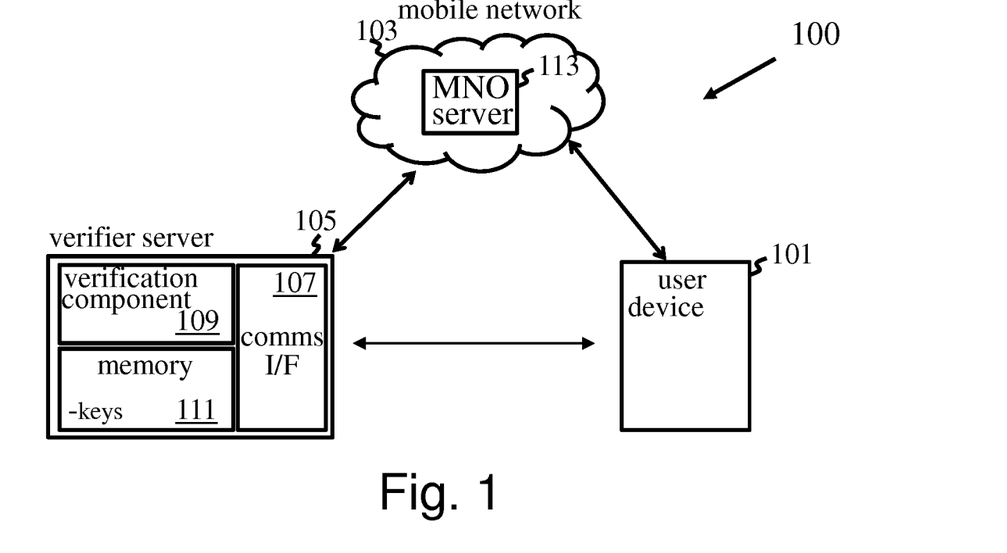
FIG. 1 is a schematic representation of a system in which authentication and/or verification methods in accordance with an embodiment.

FIG. 1 is a schematic representation of a system 100 in which authentication and/or verification methods embodying the invention may be employed. The system 100 comprises a user device 101, which is connectable to a mobile network 103, and a server 105 that provides services or resources. User device 101 may be, for example, a mobile phone, tablet, palmtop, laptop, notebook, PDA (personal digital assistant), or other mobile computer device which is connectable to a mobile network 103. In an embodiment described below, the mobile network 103 comprises a cellular telecommunications network. In other embodiments the mobile network 103 may comprise a Wi-Fi-based mobile network or any other network in which the locations of mobile computer devices can be identified for communication with the devices via the mobile network. User device 101 may for example store a device identifier for identifying the user device 101 to mobile network 103.

Server 105 (also referred to as service provider or verifier) may comprise, for example, may control access to point-of-sale devices such as a cash register or other payment terminal, an ATM (automated teller machine), a parking meter, a vending machine, a ticket machine, an access-point device e.g. for controlling entry to a building or other facility, or any other device at which a user may present use the user device 101 for accessing services or resources provided by such controlled devices.

Communication between the user device 101 and server 105 (e.g. for the authentication process) may be conducted over a communications channel provided via a temporary physical connection or a wireless link. The communications channel may exploit a communications protocol such as Wi-Fi or other wireless LAN (local area network) protocol, internet or a combination thereof but may in general be provided via any convenient communications mechanism or network such as mobile network 103.

Server 105 may include a communications interface 107 providing the circuitry for effecting communication with user devices 101. Verification component 109 comprises an authentication and/or verification logic. The verification component 109 may be implemented in hardware or software or a combination thereof. The verification component 109 may, for example, comprise a computer-readable storage medium having embodied therewith program instructions, the program instructions being executable by the server 105 to cause the server to perform steps of at least part of the present method. Memory 111 stores data used by verification component 109 e.g. in the verification process. For example, this data includes cryptographic keys, e.g. public keys of key-pairs and/or the set of reference credentials. The system 100 may further include a mobile network operator (MNO) server 113 that may be used for controlling access to the mobile network 103.

Figure 2:
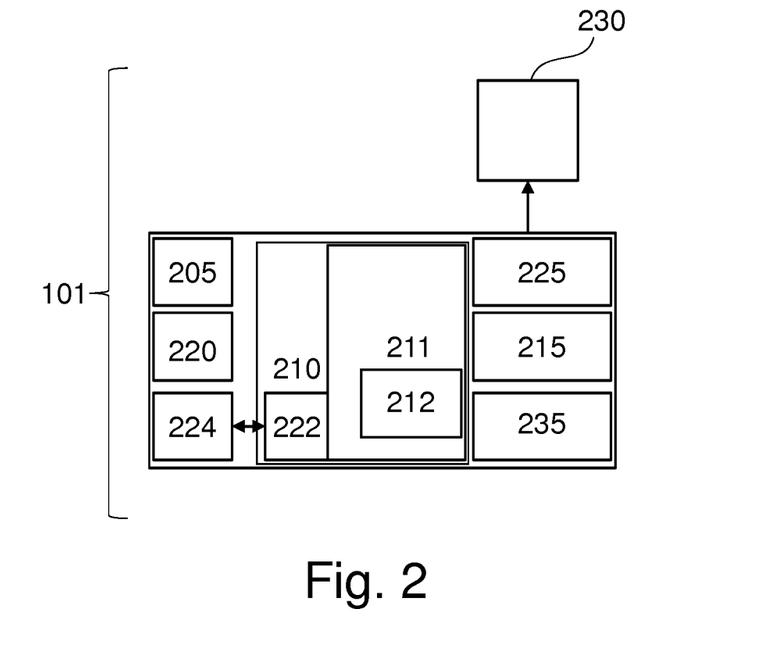
FIG. 2 is a schematic block diagram of a user device for use in the FIG. 1 system.

FIG. 2 represents further component details of the user device 101, suited for implementing method steps as involved in the present disclosure. It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 212, 222 (including firmware 222), hardware (processor) 205, or a combination thereof. In exemplary embodiments, the methods described herein are implemented in software, as an executable program, and is executed by a special or general-purpose digital computer, such as a personal computer, workstation, minicomputer, or mainframe computer.

In exemplary embodiments, in terms of hardware architecture, as shown in FIG. 2, the system 102 includes a processor 205, memory 210 coupled to a memory controller 215, and zero or more input and/or output (I/O) devices (or peripherals) (not shown) that are communicatively coupled via a local input/output controller 235. The input/output controller 235 can be, but is not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices may generally include any generalized cryptographic card or smart card known in the art.

The processor 205 is a hardware device for executing software, particularly that stored in memory 210. The processor 205 can be any custom made or commercially available processor, a central processing unit (CPU), an auxiliary processor among several processors associated with the user device 101, a semiconductor based microprocessor (in the form of a microchip or chip set), a macroprocessor, or generally any device for executing software instructions.

The memory 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 210 may incorporate electronic, magnetic, optical, and/or other types of storage media. Note that the memory 210 can have a distributed architecture, where various components are situated remote from one another, but can be accessed by the processor 205.

The software in memory 210 may include one or more separate programs, each of which comprises an ordered listing of executable instructions for implementing logical functions, notably functions involved in embodiments of this invention. In the example of FIG. 2, software in the memory 210 includes instructions 212 for implementing method for identifying dependencies between components. The software in memory 210 shall also typically include a suitable operating system (OS) 211. The OS 211 essentially controls the execution of other computer programs, such as possibly software 212 for implementing methods as described herein.

The methods described herein may be in the form of a source program 212, executable program 212 (object code), script, or any other entity comprising a set of instructions 212 to be performed. When a source program, then the program needs to be translated via a compiler, assembler, interpreter, or the like, which may or may not be included within the memory 210, so as to operate properly in connection with the OS 211. Furthermore, the methods can be written as an object oriented programming language, which has classes of data and methods, or a procedure programming language, which has routines, subroutines, and/or functions.

Other output devices such as the I/O devices may include input devices, for example but not limited to a printer, a scanner, microphone, and the like. Finally, the I/O devices may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices can be any generalized cryptographic card or smart card known in the art. The user device 101 can further include a display controller 225 coupled to a display 230. In exemplary embodiments, the user device 101 can further include a network interface for coupling to a network. The network can be an IP-based network. The network may be implemented in a wireless fashion, e.g., using wireless protocols and technologies, such as WiFi, WiMax, etc. The network can also be a packet-switched network such as a local area network, wide area network, metropolitan area network, Internet network, or other similar type of network environment. The network may be a fixed wireless network, a wireless local area network (LAN), a wireless wide area network (WAN) a personal area network (PAN), a virtual private network (VPN), intranet or other suitable network system and includes equipment for receiving and transmitting signals.

If the user device 101 is a PC, workstation, intelligent device or the like, the software in the memory 210 may further include a basic input output system (BIOS) 222. The BIOS is a set of essential software routines that initialize and test hardware at startup, start the OS 211, and support the transfer of data among the hardware devices. The BIOS is stored in ROM so that the BIOS can be executed when the user device 101 is activated.

When the user device 101 is in operation, the processor 205 is configured to execute software 212 stored within the memory 210, to communicate data to and from the memory 210, and to generally control operations of the user device 101 pursuant to the software. The methods described herein and the OS 211, in whole or in part, but typically the latter, are read by the processor 205, possibly buffered within the processor 205, and then executed. When the systems and methods described herein are implemented in software 212, as is shown in FIG. 2, the methods can be stored on any computer readable medium, such as storage 220, for use by or in connection with any computer related system or method.

Figure 3:
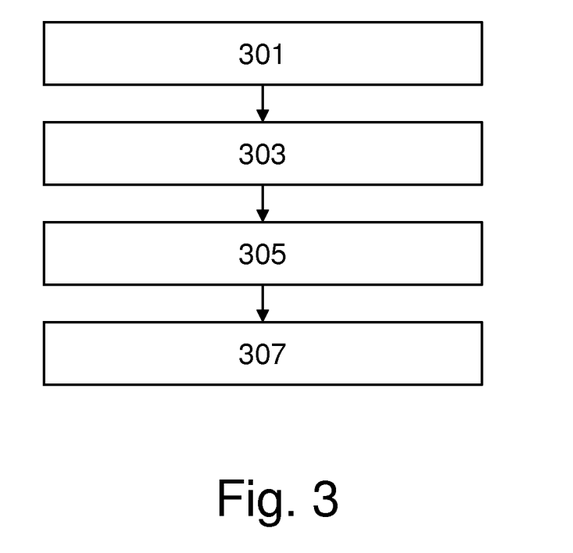
FIG. 3 is a flowchart of a method for enabling access to services of the FIG. 1 system.

FIG. 3 is a flowchart of a method for enabling access by a user device or for enabling the access to a user of the user device e.g. 101 to services provided by server 105 in a set of reference areas. For example, the server 105 may control access to devices such as a cash register or other payment terminal, an ATM (automated teller machine), a parking meter, a vending machine, a ticket machine, an access-point device e.g. for controlling entry to a building or other facility, or any other device that the user device may use for accessing services or resources provided by such controlled devices.

As shown at block 301, a set of reference credentials of the server certifying data indicating the set of reference areas may be obtained. For example, the user device 101 may receive the set of reference credentials from the server 105. The receiving may for example be performed in response to sending by the user device a request for the set of reference credentials to the server. In another example, the user device may intercept the set of reference credentials, wherein the set of reference credentials are broadcasted by the server. In a further example, the user device may read the set of reference credentials from a storage device e.g. where the server stores or publishes the set of reference credentials.

A reference credential of the set of reference credentials may for example be an attribute-based credential, wherein attributes in the reference credential indicate respective precision levels of the reference area. The set of reference credentials may be signed. An example signature scheme may comprise a Camenisch-Lysyanskaya signature (CL signature) scheme or a blind signature scheme. The CL signature scheme is further described in details below.

Certification in each of the set of reference credentials may be achieved cryptographically in known manner by encoding of the attributes to be certified via a cryptographic algorithm. The cryptographic algorithm is designed to permit verification of information certified by making cryptographic proofs for the location credential.

As shown at block 303, a location credential certifying location data indicating the current location of the user device may be obtained. For example, the location credential may be signed using the same signature method used for signing the set of reference credentials. The location credential may be an attribute-based credential, wherein attributes in the location credential indicate respective precision levels (or position granularity) of the current location of the user device.

The location credential may for example be obtained from a mobile network controller or MNO server 113. The mobile network controller 113 may compose the location credential as a secure container of attributes that hold for the user device e.g. for a certain timespan. The mobile network controller may sign the location credential. This signature proves the authenticity of the issued credential and the attributes stored within it. This signature method of the location credential may be same used for signing the set of reference credentials.

In another example, the location credential may be generated by the user device. In this case the user device may for example be a trusted device by the server 105. Certification in the location credential may be achieved cryptographically in known manner by encoding of the attributes to be certified via a cryptographic algorithm. The cryptographic algorithm is designed to permit verification of information certified by making cryptographic proofs for the location credential.

For example, the location of the user device may be determined or defined using a coordinate system as basis. The MNO server 113 may certify each digit of the user device's coordinates separately in the location credential. This way, the granularity of the location learned by the server 105 can be controlled by the number of digits disclosed in the authentication token as described below by the user device. The more disclosed digits, the more accurate the location is. There are a number of aspects to consider for this method of determining the location of the user device. One aspect is the number system in which the coordinates are represented. Assume a u-ary system is used. Then, the highest order digit splits an area in u parts, the second-highest order digit splits each of those parts again in u parts, etc. A mixed number system may also be used to represent the coordinates, i.e., each digit could use a different u. Another aspect is the coordinate system. For example, the Universal Transverse Mercator (UTM) coordinate system or the Military Grid Reference System (MGRS) may be used, where the latter uses east/north coordinates with different u values for the individual digits. In particular, MGRS coordinates are represented as e1n1 e2n2 e3n3 where e1∈{1, . . . , 60}, n1∈{C, . . . , X}, e2∈{A, . . . , Z}, n2∈{A, . . . , V}, and e3,n3∈{0, . . . , 99999}. The pair e1n1 is called grid zone designator (GZD), representing areas that are 6 degree latitude by 8 degree longitude. The pair e2n2 represents 100 km squares within a GZD. Similarly, the pair e3n3 are squares of up to meter precision within these squares. The precision depends on the numbers of digits (between 0 and 5) and must be the same for both e3 and n3.

As shown at block 305, an authentication token may be generated. The authentication token comprises a cryptographic proof for proving that the location of the user device 101 in the location credential matches at least one of reference area in the set of reference credentials. The cryptographic proof is made without revealing the location of the user device 101 to the server 105.

The cryptographic proof may for example be generated using a Zero-Knowledge proof protocol without revealing the attribute value that corresponds to the location of the user device. For example, the cryptographic proof may be turned or transformed into a signature of some message by applying the Fiat-Shamir heuristic. The authentication token may be a signature that is defined e.g. using signature schemes based on a zero-knowledge proof of knowledge (SPK).

The authentication token may be generated by comparing the location indicated in the location credential and the set of reference areas indicated in the reference credentials. For example, assuming 13S ED 00821 99622 be the reported and certified location (this is up to 1 m of precision) of the user device. And the reference areas may be the following nine neighboring 10-meter areas (9 reference sub-areas): 13S ED 0082 9962, 13S ED 0083 9962, 13S ED 0081 9962, 13S ED 0082 9961, 13S ED 0083 9961, 13S ED 0081 9961, 13S ED 0082 9963, 13S ED 0083 9963, 13S ED 0081 9963.

The server 105 may certify these reference areas (similarly to how the reported location of the user device is certified, but not bound to any device) and publishes these certificates. The user device may download (e.g. as described above in step 301) these and just use the one that matches its (higher digits) of its location and prove this match by proving equivalence of the attributes (such equivalence proofs with anonymous credentials).

As shown at block 307, the authentication token may be sent to the server 105 for accessing the services by the user device in the at least one area. For example, the submission of the authentication token may be interpreted by the server as a request to access the services by the user device in the at least one area.

In the following further details of at least part of the method steps described with reference to FIG. 3 are described based on the CL signature scheme.

In the common parameters model, several known results may be used for proving statements about discrete logarithms such as: (1) proof of knowledge of a discrete logarithm modulo a prime or a composite; (2) proof of knowledge of equality of representation modulo two (possibly different) prime or composite moduli; (3) proof that a commitment opens to the product of two other committed values; (4) proof that a committed value lies in a given integer interval; as well as (5) proof of the disjunction or conjunction of any two of the previous proofs. These protocols modulo a composite are secure under the strong RSA (Rivest, Shamir, Adleman) assumption and modulo a prime under the discrete logarithm assumption.

When referring to the proofs above, one follow the notation introduced by Camenisch and Stadler ("Efficient Group Signature Schemes for Large Groups", J. Camenisch and M. Stadler, in B. Kaliski, editor, Advances in Cryptology—CRYPTO '97, volume 1296 of Lecture Notes in Computer Science, pages 410-424, Springer Verlag, 1997) for various proofs of knowledge of discrete logarithms and proofs of the validity of statements about discrete logarithms. For instance, PK $\{(\alpha, \beta, \delta): y=g^\alpha h^\beta \wedge \tilde{y}=\tilde{g}^\alpha \tilde{h}^\delta \wedge (u \leq \alpha \leq v)\}$ denotes a "zero-knowledge Proof of Knowledge of integers $\alpha$, $\beta$, and $\delta$ such that $y=g^\alpha h^\beta$ and $\tilde{y}=\tilde{g}^\alpha \tilde{h}^\delta$ holds, where $u \leq \alpha \leq v$", and where y, g, h, $\tilde{y}$, $\tilde{g}$, $\tilde{h}$ are elements of some groups $G=\langle g \rangle = \langle h \rangle$ and $\tilde{G}=\langle \tilde{g} \rangle = \langle \tilde{h} \rangle$. The convention is that Greek letters denote quantities of which knowledge is being proved, whereas all other values are known to the verifier. The Fiat-Shamir heuristic ("How to prove yourself: Practical solutions to identification and signature problems", A. Fiat and A. Shamir, in A. M. Odlyzko, editor, Advances in Cryptology—CRYPTO '86, volume 263 of Lecture Notes in Computer Science, pages 186-194. Springer Verlag, 1987) may be applied to turn such proofs of knowledge into signatures on some message m; this is denoted as, e.g., SPK$\{(\alpha): y=g^\alpha\}(m)$. Given a protocol in this notation, it is straightforward to derive an actual protocol implementing the proof, and suitable protocols for the following embodiment will be readily apparent to those skilled in the art.

Camenisch-Lysyanskaya signatures are described in detail in: "A Signature Scheme with Efficient Protocols", J. Camenisch and A. Lysyanskaya, in S. Cimato, C. Galdi and G. Persiano editors, Security in Communications Networks, Third International Conference, SCN 2002, volume 2576 of Lecture Notes in Computer Science, pages 268-289, Springer Verlag, 2003. A variant is presented that allows messages to be negative integers as well. Let $l_m$, $l_e$, $l_n$, $l_r$ and L be system parameters. $l_r$ is a security parameter, and the meanings of the others will become apparent in the following.

The set of integers $\{-(2^{l_m}-1), \ldots, (2^{l_m}-1)\}$ may be denoted by $\pm\{0,1\}^{l_m}$. Elements of this set can thus be encoded as binary strings of length $l_m$ plus an additional bit carrying the sign, i.e., $l_m+1$ bits in total.

Key generation: on input $l_n$, choose an $l_n$-bit RSA modulus n such that n=pq, p=2p'+1, q=2q'+1, where p, q, p', and q' are primes. Choose, uniformly at random, $R_0, \ldots, R_{L-1}$, S, Z $\square$ QRn. Output the public key (n, $R_0, \ldots, R_{L-1}$, S, Z) and the secret key p.

Message space is the set $\{(m_0, \ldots, m_{L-1}): m_i \in \pm\{0,1\}^{l_m}\}$.

Signing algorithm: on input $m_0, \ldots, m_{L-1}$, choose a random prime number e of length $l_e > l_m+2$, and a random number v of length $l_v = l_n + l_m + l_r$.

$$\text{Compute } A = \left(\frac{Z}{R_0^{m_0} \ldots R_{L-1}^{m_{L-1}} S^v}\right)^{\frac{1}{e}} \mod n.$$

The signature consists of (e, A, v).

Verification algorithm: to verify that the tuple (e, A, v) is a signature on message $(m_0, \ldots, m_{L-1})$, check that the following statements hold:

$Z \equiv A^e R_0^{m_0} \ldots R_{L-1}^{m_{L-1}} S^v \pmod{n}, m_i \in \pm\{0,1\}^{l_m}$, and $2^{l_e} > e > 2^{l_e-1}$.

A prover (e.g. user device 101) can prove possession of a CL signature without revealing any other information about the signature. For that the discrete-logarithm-based zero-knowledge proof protocols discussed above may be used. If A were a public value, one could do so by proving knowledge representation of Z with respect to $R_0, \ldots, R_{L-1}$, S and A. However, making A public would make all transactions linkable. Luckily, one can randomize A: given a signature (A, e, v), the tuple (A':=AS$^{-r}$ mod n, e, v':=v+er) is a valid signature also for any value of r. Now, provided that A $\square \langle S \rangle$ and that r is chosen uniformly at random from $\{0,1\}^{l_n+l_\phi}$ the value A' is distributed statistically close to uniform over $Z_n^*$. Thus, the user could compute a fresh A' each time, reveal it, and then run the following protocol with the verifier:

PK$\{(\varepsilon, v', \mu_0, \ldots, \mu_{L-1}): Z \equiv \pm R_0^{\mu_0} \ldots R_{L-1}^{\mu_{L-1}} A'^\varepsilon S^{v'}$
$\pmod{n} \wedge \mu_i \in \pm\{0,1\}^{l_m} \wedge \varepsilon \in [2^{l_e-1}+1, 2^{l_e}-1]\}$ Now, there is a technical consequence from this proof protocol regarding the statements $\mu_i \in \pm\{0,1\}^{l_m} \wedge \varepsilon \in [2^{l_e-1}+1, 2^{l_e}-1]$. Although these can be implemented virtually for free, they require that the secret actually lies in a smaller interval, i.e. the signer needs to choose e from $[2^{l_e-1}-2^{l'_e}+1, 2^{l_e-1}+2^{l'_e}-1]$ with $l'_e < l_e - l_\phi - l_H - 3$ where $l_\phi$ and $l_H$ are security parameters (the first controlling statistical zero-knowledge and the second being the size of the challenge message in the PK protocol). Similarly, it is required that the size of the message input to the signature scheme is limited: $m_i \in \pm\{0, 1\}^{l_m - l_\phi - l_H - 2}$. As the proofs can only guarantee that the absolute value of the messages are smaller than $2^{l_m}$, it is also included negative messages in the message space for consistency. Finally, it is noted that in $Z \equiv \pm R_0^{\mu_0} \ldots R_{L-1}^{\mu_{L-1}} A'^\varepsilon S^{v'} \pmod n$ there appears a "±". This is a technicality in the proofs of knowledge in RSA groups: because of the group structure of $Z_n^*$ and its sub-group $QR_n$ over a special RSA modulus n, there exist small-order subgroups which may allow a prover to include a multiple of small known order as well as to prove a statement for the negation with probability ½. This is not a problem for the application at hand, however, because e (being an odd prime by definition) maintains the negation and allows a reduction to the strong RSA assumption in this case.

The at least part of the steps of FIG. 3 may be described using the CL signature scheme as follows.

Let $(n, R_0, \ldots, R_{L-1}, S, Z)$ be the public key of the service provider 105 and $(\tilde{n}, \tilde{R}_0, \ldots, \tilde{R}_{L-1}, \tilde{S}, \tilde{Z})$ be the public key of the MNO server 113.

Let the reference areas (e.g. of step 301) be, e.g., 13S ED 0082 9962, 13S ED 0083 9962, 13S ED 0081 9962, 13S ED 0082 9961, 13S ED 0083 9961, 13S ED 0081 9961, 13S ED 0082 9963, 13S ED 0083 9963, and 13S ED 0081 9963. The reference areas may be designated as each as $(a,b,x_1,x_2,x_3,x_4,y_1,y_2,y_3,y_4)_i$. The reference areas are provided using Military grid reference system (MGRS). For example, in the reference area 13S ED 0082 9962, attribute a may represent the precision level "13S", attribute b may represent the precision level "ED", and attribute $x_j(j=1-4)$ and $y_j(j=1-4)$ represent the $j^{th}$ digit of x coordinates "0082" and y coordinates "9962" respectively. The reference credentials on the reference areas may be issued by the service provider 105 in the form of a CL signature or values $(A, e, v)_i$ such that $$Z \equiv A^e R_0^{\ a} R_1^{\ b} R_2^{\ x_1} R_3^{\ x_2} R_4^{\ x_3} R_5^{\ x_4} R_6^{\ y_1} R_7^{\ y_2} R_8^{\ y_3} R_9^{\ y_4} S^v \pmod{n}, a, b, x_i, y_i \in \pm\{0,1\}^{l_m}, \text{ and } 2^{l_e} > e > 2^{l_e-1}$$

holds. These credentials are published by the service provider 105. The reference credential thus certifies the attributes a, b, xj and yj under a private key of a first public-private key pair of the service provider 105.

When a user of the user device 101 wants to prove to the service provider 105 that the user device 101 is in one of the reference areas, the following may be performed, where it is assumed that the user device 101 has already obtained the reference credentials from the service provider 105.

First the user device 101 may send a request (e.g. step 303) for a location credential from the MNO server 113 certifying the current location of the user device 101. E.g., let 13S ED 00834 99616=$(\tilde{a},\tilde{b},\tilde{x}_1,\tilde{x}_2,\tilde{x}_3,\tilde{x}_4,\tilde{x}_5,\tilde{y}_1,\tilde{y}_2,\tilde{y}_3,\tilde{y}_4,\tilde{y}_5)$ be the location of the user device 101 and let $s_u$ be the user's secret key. The granularity with which the position of the reference areas and location of the user device 101 is determined is the same. Running the issuance protocol e.g. between the MNO server 113 and the user device, the user device 101 may obtain a location credential in the form of CL signature $(\tilde{A}, \tilde{e}, \tilde{v})$ such that:

$$\tilde{Z} \equiv \tilde{A}^{\tilde{e}} \tilde{R}_0^{\ s_u} \tilde{R}_1^{\ \tilde{a}} \tilde{R}_2^{\ \tilde{b}} \tilde{R}_3^{\ \tilde{x}_1} \tilde{R}_4^{\ \tilde{x}_2} \tilde{R}_5^{\ \tilde{x}_3} \tilde{R}_6^{\ \tilde{x}_4} \tilde{R}_7^{\ \tilde{x}_5} \tilde{R}_8^{\ \tilde{y}_1} \tilde{R}_9^{\ \tilde{y}_2} \tilde{R}_{10}^{\ \tilde{y}_3} \tilde{R}_{11}^{\ \tilde{y}_4} \tilde{R}_{12}^{\ \tilde{y}_5} \tilde{S}^{\tilde{v}}, s_u, \tilde{a}, \tilde{b}, \tilde{x}_j, \tilde{y}_j \in \pm\{0,1\}^{l_m}, \text{ and } 2^{l_e} > \tilde{e} > 2^{l_e-1}$$

holds.

To prove that the user device 101 is in one of the reference areas, the user device 101 may prove that the parts of the coordinates that appear in the reference area credentials also appear in the location credential issued by the MNO server 113. This is done as follows: Assume that $(A, e, v)_i$ is the reference area credential the coordinates certified by it match the ones of the location credential from the MNO server 113. The user device 101 may select or determine a random r and $\tilde{r}$ and computes $A' := AS^{-r} \bmod n$, $v' := v + er$, $\tilde{A}' := \tilde{A}\tilde{S}^{-\tilde{r}} \bmod n$, and $\tilde{v}' := \tilde{v} + \tilde{e}\tilde{r}$. The user device 101 may further compute the proof Π as follows:

$$\pi := SPK\{(s_u, e, \tilde{e}, x_1, \ldots, x_4, y_1, \ldots, y_4, \tilde{x}_5, \tilde{y}_5, v, \tilde{v}):$$
$$Z \equiv (\tilde{A}')^{\tilde{e}} \tilde{R}_0^{\ s_u} \tilde{R}_1^{\ \tilde{a}} \tilde{R}_2^{\ \tilde{b}} \tilde{R}_3^{\ x_1} \tilde{R}_4^{\ x_2} \tilde{R}_5^{\ x_3} \tilde{R}_6^{\ x_4}$$
$$\tilde{R}_7^{\ \tilde{y}_5} \tilde{R}_8^{\ y_1} \tilde{R}_9^{\ y_2} \tilde{R}_{10}^{\ y_3} \tilde{R}_{11}^{\ y_4} \tilde{R}_{12}^{\ \tilde{y}_5} \tilde{S}^{\tilde{v}'} \pmod{\tilde{n}} \land Z \equiv$$
$$(A')^e R_0^{\ a} R_1^{\ b} R_2^{\ x_1} R_3^{\ x_2} R_4^{\ x_3} R_5^{\ x_4} R_6^{\ y_1} R_7^{\ y_2} R_8^{\ y_3} R_9^{\ y_4} S^{v'}$$
$$\pmod{n} \land s_u, a, b, x_i, y_i, \tilde{x}_i, \tilde{y}_i, v', \tilde{v}' \in \pm\{0,1\}^{l_m} \land e, \tilde{e} \in$$
$$[2^{l_e-1} + 1, 2^{l_e} - 1]\}$$

The resulting A', Ã' and Π may form the authentication token (e.g. of step 305) that the user device 101 sends to the service provider 105. The service provider 105 verifies the proof H and thus will determine that the user device 101 is within one of the reference areas without learning in which particular one. The user device 101 or a user of the user device may then be enabled to access the services and/or resources in the one of the reference areas.

Figure 4:
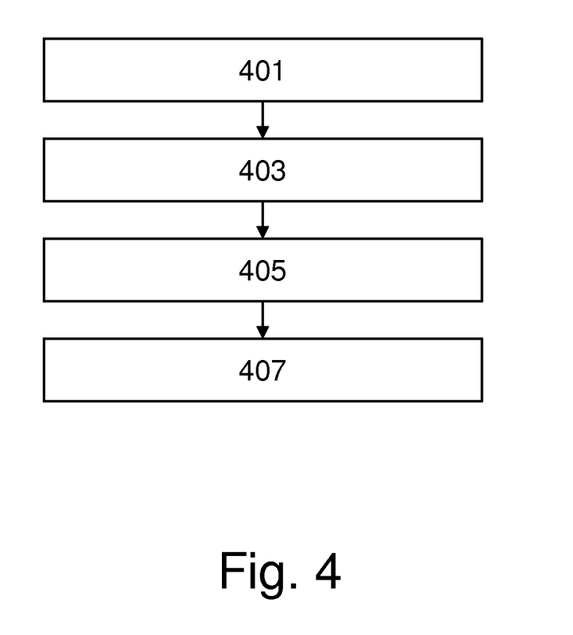
FIG. 4 is a flowchart of another method for enabling access to services of the FIG. 1 system.

FIG. 4 is a flowchart of a method at the server 105 for enabling access to services provided by the server 105 in a set of reference areas. As shown at block 401, a set of reference credentials of the server certifying data indicating the reference areas may be published. For example, the set of areas may comprise 13S ED 0082 9962, 13S ED 0083 9962, 13S ED 0081 9962, 13S ED 0082 9961, 13S ED 0083 9961, 13S ED 0081 9961, 13S ED 0082 9963, 13S ED 0083 9963, and 13S ED 0081 9963.

In one example, the server 105 may certify the full content of each of the set of reference areas. In another example, the coordinates that are known and are the same for all reference credentials may be published. For instance a reference area 13S ED 008 996 (as it is common to the 9 reference areas above) would be public and the server 105 would certifies the lower digits of the reference areas only, 2 2, 3 2, 1 2, 2 1, 3 1, 1 1, 2 3, 3 3, 1 3. This may not reduce the amount of the reference area credentials just make them smaller and the proof that the user will have to do more efficient.

In a further example, if the reference areas form a square. As follows: Let 13S ED 0082 9962 be the center of the reference areas. This area can be published. Then, the service provider just publishes signatures on the allowed deltas. For example this would be −1, 0, 1 for the last coordinates, i.e., this would only be 3 CL signatures instead of nine. The CL signatures may be as follows $(A, e, v)_{-1}$, $(A, e, v)_0$, $(A, e, v)_1$, (these would only have one attribute each, e.g., $(Z \equiv A^e R_0^{-1} S^v \pmod{n}))$.

In a further example, if the reference areas form a square. As follows: Let 13S ED 0082 9962 be the center of the reference areas. This area can be published. Then, the service provider just publishes signatures on the allowed deltas. For example this would be −1, 0, 1 for the last coordinates, i.e., this would only be 3 CL signatures instead of nine. The CL signatures may be as follows $(A, e, v)_{-1}$, $(A, e, v)_0$, $(A, e, v)_1$, (these would only having one attribute each, e.g., $(Z \equiv A^e R_0^{-1} S^v \pmod{n}))$.

Let 13S ED 00793 99616 be the location of the user device and 13S ED 0080 9962 be the central reference area. Thus the user device's location is off by −1 and +1 in the forth digit of the x and y coordinates, respectively. To provide that the user device is off by the certified differences, the user device performs the following.

Assume that $(A, e, v)_x$ and $(A, e, v)_y$ be the server's credential corresponding to the offset of the user in the x and the y direction, respectively (actually, these might point to the same credential, but if that be the case, there is still a need to treat them as separate credentials otherwise that fact may be leaked). The user device may pick random $r_x$, $r_s$ and $\tilde{r}$ and computes:

$$A_x' := A_x S^{-r_x} \bmod n, v_x' := v_x + e_x r_x, A_y' := A_y S^{-r_y} \bmod n,$$
$$v_y' := v_y + e_y r_y, \tilde{A}' := \tilde{A}\tilde{S}^{-\tilde{r}} \bmod \tilde{n}, \text{ and } \tilde{v}' := \tilde{v} + \tilde{e}\tilde{r}.$$

The user device may then compute the proof Π as follows $$\pi := SPK\{(s_u, e, \tilde{e}, \tilde{x}_3, \ldots, \tilde{x}_5, \tilde{y}_3, \ldots, \tilde{y}_5, v_x, v_y, \tilde{v}):$$
$$\tilde{Z}/(\tilde{R}_1^{\ 13S} \tilde{R}_2^{\ ED} \tilde{R}_4^{\ 0} \tilde{R}_8^{\ 9} \tilde{R}_9^{\ 9}) \equiv (\tilde{A}')^{\tilde{e}} \tilde{R}_0^{\ s_u} \tilde{R}_5^{\ \tilde{x}_0} \tilde{R}_6^{\ \tilde{x}_3}$$
$$\tilde{R}_7^{\ \tilde{x}_4} \tilde{R}_{10}^{\ \tilde{y}_3} \tilde{R}_{11}^{\ \tilde{y}_4} \tilde{R}_{12}^{\ \tilde{y}_5} \tilde{S}^{\tilde{v}'} \pmod{\tilde{n}} \land Z \equiv (A_x')^{e_x}$$
$$R_0^{\ (80-10-\tilde{x}_3-\tilde{x}_4)} S^{v_x} \pmod{n} \land Z \equiv (A_y')^{e_y} R_0^{\ (62-10-\tilde{y}_3-\tilde{y}_4)}$$
$$S^{v_y} \pmod{n} \land s_u, \tilde{x}_i, \tilde{y}_i, v_x', v_y', \tilde{v}' \in \pm\{0,1\}^{l_m} \land e, \tilde{e} \in$$
$$[2^{l_e-1} + 1, 2^{l_e} - 1]\}$$

The resulting $A_x'$, $A_y'$, Ã' and Π may form the authentication token.

As shown at block 405, the server 105 verifies π (e.g. by performing a cryptographic verification process) and thus may determine that the user device is within one of the reference areas without learning in which particular one. In the verification process, the server 105 can use the public key of a key pair used to generate the location credential to verify validity of the location credential possessed by the user device. In addition, the server 105 may also check that the issue time indicated by the timestamp t' (in the authentication token) is within a predetermined time interval preceding the current time t.

As shown at block 407, the server 105 may enable access to the services in the at least one area to the user device. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A cryptographic method for enabling access to services provided by a server in a set of reference areas; the method comprising:

obtaining, by a user device, a set of reference credentials of the server that certifies data indicating the set of reference areas, wherein the set of reference areas are defined using Military Grid Reference System (MGRS), wherein at least one reference credential of the set of reference credentials is an attribute-based credential, wherein attributes in the reference credential indicate respective MGRS precision levels of a reference area of the set of reference areas, wherein the set of reference credentials are signed by the server using a predefined signature scheme, wherein the set of reference credentials are obtained from the server by the user device, wherein the user device is connected to a mobile network controller and the server, wherein the mobile network controller is of a network to which the user device is connected, wherein the mobile network controller comprises a mobile network operator server;

obtaining, by the user device, a location credential that certifies location data indicating a current location of the user device, wherein the location credential is an attribute-based credential, wherein attributes in the location credential indicate respective MGRS precision levels of the current location of the user device, wherein the location credential is obtained from the mobile network operator server by the user device, wherein the location credential is signed by the mobile network operator server using the predefined signature scheme;

generating, by the user device, an authentication token comprising a cryptographic proof for proving that the current location of the user device certified by the location credential matches at least one reference area certified by the set of reference credentials, the cryptographic proof proving that the respective MGRS precision levels of the at least one reference area match at least a part of the respective MGRS precision levels of the current location of the user device; and sending, by the user device, the authentication token to the server for accessing the services in the at least one reference area, wherein the server is configured to determine from the cryptographic proof that the location of the user device matches at least one area of the set of reference areas, wherein the server performs the determining without receiving the current location of the user device.

2. The method of claim 1, wherein the predefined signature scheme comprises a Camenisch-Lysyanskaya signature scheme.

3. The method of claim 1, wherein a reference credential of the reference credentials further certifies a time period for accessing the reference areas, and wherein said authentication token includes a timestamp that matches the time period, the timestamp indicating the time at which the current location is determined.

4. The method of claim 1, the obtaining of the set of reference credentials comprising: receiving from the server a message comprising the set of reference credentials.

5. The method of claim 1, wherein the location credential certifies the location data using a cryptographic key of the mobile network controller.

6. The method of claim 1, wherein the cryptographic proof is condensed into a cryptographic function comprising a signature proof of knowledge, SPK, for communication to the server.

7. The method of claim 1, wherein the authentication token comprises a cryptographic token.

8. The method of claim 1, wherein the authentication token is an anonymous token.

9. A cryptographic method for enabling access to services provided by a server in a set of reference areas; the method comprising at the server:

publishing a set of reference credentials that certifies data indicating the set of reference areas, wherein the set of reference areas are defined using Military Grid Reference System (MGRS), wherein at least one reference credential of the set of reference credentials is an attribute-based credential, wherein attributes in the reference credential indicate respective MGRS precision levels of a reference area of the set of reference areas, wherein the set of reference credentials are signed by the server using a predefined signature scheme;

receiving an authentication token from a user device, the authentication token comprising a cryptographic proof for proving that a location of the user device matches at least one reference area of the set of reference areas;

determining from the cryptographic proof that the location of the user device matches the at least one reference area of the set of reference areas, wherein the determining is performed without receiving the location of the user device; and enabling the access to the services in the at least one reference area;

wherein prior to receiving the authentication token from the user, the user device is configured to obtain a location credential that certifies location data indicating the location of the user device, wherein the location credential is an attribute-based credential, wherein attributes in the location credential indicate respective MGRS precision levels of the location of the user device, wherein the location credential is obtained from a mobile network operator server by the user device, wherein the location credential is signed by the mobile network operator server using the predefined signature scheme, wherein the cryptographic proof proves that the respective MGRS precision levels of the at least one reference area match at least a part of the respective MGRS precision levels of the location of the user device.

10. A computer program product comprising a computer-readable storage medium having computer-readable program code embodied therewith, the computer-readable program code configured to implement a method comprising:

obtaining, by a user device, a set of reference credentials of a server that certifies data indicating a set of reference areas, wherein the set of reference areas are defined using Military Grid Reference System (MGRS), wherein at least one reference credential of the set of reference credentials is an attribute-based credential, wherein attributes in the reference credential indicate respective MGRS precision levels of a reference area of the set of reference areas, wherein the set of reference credentials are signed by the server using a predefined signature scheme, wherein the set of reference credentials are obtained from the server by the user device, wherein the user device is connected to a mobile network controller and the server, wherein the mobile network controller is of a network to which the user device is connected, wherein the mobile network controller comprises a mobile network operator server;

obtaining, by the user device, a location credential that certifies location data indicating a current location of the user device, wherein the location credential is an attribute-based credential, wherein attributes in the location credential indicate respective MGRS precision levels of the current location of the user device, wherein the location credential is obtained from the mobile network operator server by the user device, wherein the location credential is signed by the mobile network operator server using the predefined signature scheme;

generating, by the user device, an authentication token comprising a cryptographic proof for proving that the current location of the user device certified by the location credential matches at least one reference area certified by the set of reference credentials, the cryptographic proof proving that the respective MGRS precision levels of the at least one reference area match at least a part of the respective MGRS precision levels of the current location of the user device; and sending, by the user device, the authentication token to the server for accessing services in the at least one reference area, wherein the server is configured to determine from the cryptographic proof that the current location of the user device matches at least one area of the set of reference areas, wherein the server performs the determining without receiving the current location of the user device.

11. The computer program product of claim 10, wherein the predefined signature scheme comprises a Camenisch-Lysyanskaya signature scheme.

12. The computer program product of claim 10, wherein a reference credential of the reference credentials further certifies a time period for accessing the reference areas, and wherein said authentication token includes a timestamp that matches the time period, the timestamp indicating the time at which the current location is determined.

13. The computer program product of claim 10, the obtaining of the set of reference credentials comprising: receiving from the server a message comprising the set of reference credentials.

14. The computer program product of claim 10, wherein the location credential certifies the location data using a cryptographic key of the mobile network controller.

* * * * *